(12) United States Patent
Machida et al.

(10) Patent No.: US 12,074,403 B2
(45) Date of Patent: Aug. 27, 2024

(54) CONNECTOR RECEIVER UNIT MANUFACTURING METHOD, CONNECTOR RECEIVER UNIT, AND ELECTRICAL COMPONENT

(71) Applicant: YAMADA MANUFACTURING CO., LTD., Kiryu (JP)

(72) Inventors: Katuhiro Machida, Kiryu (JP); Rie Aoyagi, Kiryu (JP); Takashi Yamazaki, Kiryu (JP); Yasuaki Motegi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 284 days.

(21) Appl. No.: 17/838,635

(22) Filed: Jun. 13, 2022

(65) Prior Publication Data

US 2022/0407276 A1 Dec. 22, 2022

(30) Foreign Application Priority Data

Jun. 18, 2021 (JP) .................................. 2021-101753

(51) Int. Cl.
*H01R 43/24* (2006.01)
*H01R 13/66* (2006.01)

(52) U.S. Cl.
CPC ......... *H01R 43/24* (2013.01); *H01R 13/6616* (2013.01); *H01R 2201/10* (2013.01)

(58) Field of Classification Search
CPC ........ H02K 5/225; H02K 3/522; H02K 3/345; H02K 3/50; H02K 3/52; H02K 3/46
USPC ........................................... 310/214, 215, 71
See application file for complete search history.

(56) References Cited

U.S. PATENT DOCUMENTS

2021/0050760 A1* 2/2021 Yamaguchi ............ H02K 5/225

FOREIGN PATENT DOCUMENTS

JP 2001-128407 5/2001

* cited by examiner

*Primary Examiner* — Leda T Pham
(74) *Attorney, Agent, or Firm* — Rankin, Hill & Clark LLP

(57) ABSTRACT

A stator according to an aspect of the present disclosure includes a connector molding portion including a base portion and a mounting portion and a receiver side terminal. The connector molding portion is provided with a communication hole which includes a first concave portion including an inner opening inside a housing extending through the base portion in an X direction and a second concave portion including a bottom surface opening on a bottom surface of the mounting portion extending through the base portion in a Y direction and communicates the inside and outside of the housing through the first concave portion and the second concave portion. The first concave portion penetrates the base portion in the X direction through an outer opening. A rear surface covering portion is provided to close the outer opening.

9 Claims, 9 Drawing Sheets

CONNECTOR RECEIVER UNIT MANUFACTURING METHOD, CONNECTOR RECEIVER UNIT, AND ELECTRICAL COMPONENT

TECHNICAL FIELD

The present disclosure relates to a connector receiver unit manufacturing method, a connector receiver unit, and an electrical component.

Priority is claimed on Japanese Patent Application No. 2021-101753, filed Jun. 18, 2021, the content of which is incorporated herein by reference.

BACKGROUND ART

A connector receiver is provided in an electrical component (for example, a motor or pump) mounted on a vehicle or the like. The connector receiver penetrates the inside and outside of a housing in the electrical component. A connector which extends from an external power supply outside the housing is mounted on the connector receiver. Accordingly, a control board provided inside the housing and the external power supply are electrically connected to each other via the connector receiver.

The connector receiver includes a molded body which is formed from a resin material or the like and a terminal which is molded in the molded body. The molded body is provided with a communication hole which communicates the inside and outside of the housing. According to this configuration, a gas inside and outside the housing enters and exits through the communication hole in accordance with a pressure difference inside and outside the housing. As a result, a differential pressure inside and outside the housing is relaxed.

As a method of forming the communication hole, for example, Japanese Unexamined Patent Application No. 2001-128407 discloses a method of performing an injection-molding operation while front end portions of two rods are butted against each other at the time of forming a molded body and then pulling out the two rods.

According to this method, a portion molded by two rods communicates with each other through the abutting portion of the rods. As a result, it is considered that the portion molded by the two rods functions as a communication hole.

However, in the above-described related art, there is still room for improvement in terms of the shape accuracy or manufacturing efficiency of the communication hole, the durability of a molding die (rod), and the like. Specifically, in the above-described related art, since it is necessary to abut the front end portions of the rods, high accuracy is required for the positioning of the rods. Since the rods are cantilevered and extended, there is a possibility that the rods may be displaced or deformed due to an injection pressure or the like during molding. When the injection-molding operation is performed while the front end portions of the rods are displaced from each other, the communication hole is not formed to have a desired cross-sectional area and the communication hole is closed halfway. As a result, there is a possibility that yield may decrease.

SUMMARY OF INVENTION

The present disclosure provides a connector receiver unit manufacturing method, a connector receiver unit, and an electrical component capable of improving the shape accuracy or manufacturing efficiency of a communication hole and the durability of a manufacturing apparatus.

Solution to Problem

In order to solve the above-described problems, the present disclosure adopts the following aspects.

(1) A connector receiver unit manufacturing method according to an aspect of the present disclosure is a method of manufacturing a connector receiver unit provided in a housing accommodating an electronic component and mounted with a connector extending from an external power supply so that the electronic component and the external power supply are electrically connected to each other, wherein the connector receiver unit includes a first molding portion which includes a base portion extending inside and outside the housing and a bottomed tubular mounting portion opening outside the housing and is integrally formed by a resin material and a terminal which includes a first end portion exposed inside the housing and connected to the electronic component and a second end portion exposed inside the mounting portion and connected to the connector and is provided to penetrate the first molding portion, wherein the first molding portion is provided with a communication hole which includes a first concave portion including a first opening inside the housing extending through the base portion in a first direction and a second concave portion including a second opening on a bottom surface of the mounting portion extending through the base portion in a second direction intersecting the first direction and communicates the inside and outside of the housing through the first concave portion and the second concave portion, wherein the method includes a first molding step of forming the first molding portion by performing a molding operation with a resin material while a first pin forming the first concave portion, a second pin forming the second concave portion, and the terminal are set in a molding die, wherein in the first molding step, the first concave portion and the second concave portion are formed by performing an injection-molding operation while both end portions of one of the first pin and the second pin are supported by the molding die, one end portion of the other pin is supported by the molding die, and the other end portion of the other pin engages with the one pin and pulling out the first pin and the second pin, and wherein the method includes a closing step of closing one opening portion of the opening portions formed by the one pin in the first molding portion by a plug portion after the first molding step.

(4) A connector receiver unit according to an aspect of the present disclosure includes: a first molding portion which includes a base portion extending inside and outside a housing accommodating an electronic component and a bottomed tubular mounting portion opening outside the housing and mounted with a connector extending from an external power supply and is integrally formed by a resin material; and a terminal which includes a first end portion exposed inside the housing and connected to the electronic component and a second end portion exposed inside the mounting portion and connected to the connector and is provided to penetrate the first molding portion, wherein the first molding portion is provided with a communication hole which includes a first concave portion including a first opening inside the housing extending through the base portion in a first direction and a second concave portion including a second opening on a bottom surface of the mounting portion extending through the base portion in a second direction intersecting the first direction and communicates the inside and outside of the housing through the first concave portion and the second concave portion, wherein one of the first concave portion and the second concave portion penetrates the base portion in the first direction through a penetration hole, and wherein a plug portion is provided to close the penetration hole.

According to this aspect, since both end portions of one pin are supported by a molding die, it is easy to ensure the strength of one pin against an injection pressure or the like. Accordingly, it is possible to suppress displacement, deformation, or the like of one pin. In accordance with this, since the other pin easily engages with one pin, it is possible to easily align the first pin and the second pin with high accuracy. Thus, it is possible to improve the shape accuracy or manufacturing efficiency of the communication hole and to improve the durability of the molding die compared to the conventional configuration in which the front end portions of the rods are butted against each other.

(2) In the connector receiver unit manufacturing method according to the above aspect (1), in the closing step, the first molding portion is preferably molded by a resin material to form the plug portion.

In the connector receiver unit of the above aspect, the connector receiver unit preferably includes a second molding portion which includes the plug portion while molding the first molding portion.

According to this aspect, it is possible to reliably and simply close one concave portion compared to a configuration in which a separate member is fitted to a penetration hole of one concave portion or the like.

(3) In the connector receiver unit manufacturing method according to the above aspect (1) or (2), a length in a direction orthogonal to the second direction in the first pin when viewed from the first direction may be different from a length in a direction orthogonal to the first direction in the second pin when viewed from the second direction, and a large-length pin in the first pin and the second pin is preferably provided with an engagement portion which accommodates a small-length pin and regulates the relative movement of the first pin and the second pin.

According to this aspect, it is easy to suppress the displacement or the like of the first pin and the second pin due to the injection pressure or the like during molding. Therefore, it is possible to form the communication hole with higher accuracy.

(5) In the connector receiver unit according to the above aspect (4), the second molding portion preferably includes a covering portion which covers a resistor inside the housing, and the resistor may be electrically connected to the electronic component.

Since the connector receiver unit according to the above aspect can form the communication hole in a desired shape with high accuracy, it is possible to efficiently allow the gas to enter and exit inside and outside the housing through the communication hole. Therefore, even when a temperature difference occurs inside and outside the housing due to the heating of the resistor, it is possible to promptly relax the differential pressure inside and outside the housing in accordance with the temperature difference.

(7) In the connector receiver unit according to any one of the above aspects (4) to (6) a cross-sectional area orthogonal to the second direction in the second concave portion is preferably gradually increased as it goes from a communication portion with the first concave portion toward the second opening.

According to this aspect, the second pin for molding the second concave portion can be formed in a tapered shape from the front end portion toward the base end portion. Accordingly, since the taper can be used as a pull-out taper of the second pin, the releasability can be improved.

(8) In the connector receiver unit according to any one of the above aspects (4) to (7), the plug portion is preferably provided at a portion near the penetration hole with respect to a communication portion with the first concave portion and the second concave portion in the one concave portion.

According to this aspect, it is possible to suppress the interruption between the first concave portion and the second concave portion and to communicate the inside and outside of the housing through the communication hole.

(9) An electrical component according to the present disclosure includes: a housing which accommodates an electronic component; and the connector receiver unit according to the above aspect which is provided in the housing.

According to this aspect, since the connector receiver unit according to the above aspect is provided, it is possible to suppress atmospheric pressure fluctuations in the housing and to provide the electrical component with excellent durability and operational reliability.

According to the above aspects, it is possible to improve the shape accuracy or manufacturing efficiency of the communication hole and the durability of the manufacturing apparatus.

DESCRIPTION OF EMBODIMENTS

Figure 1:
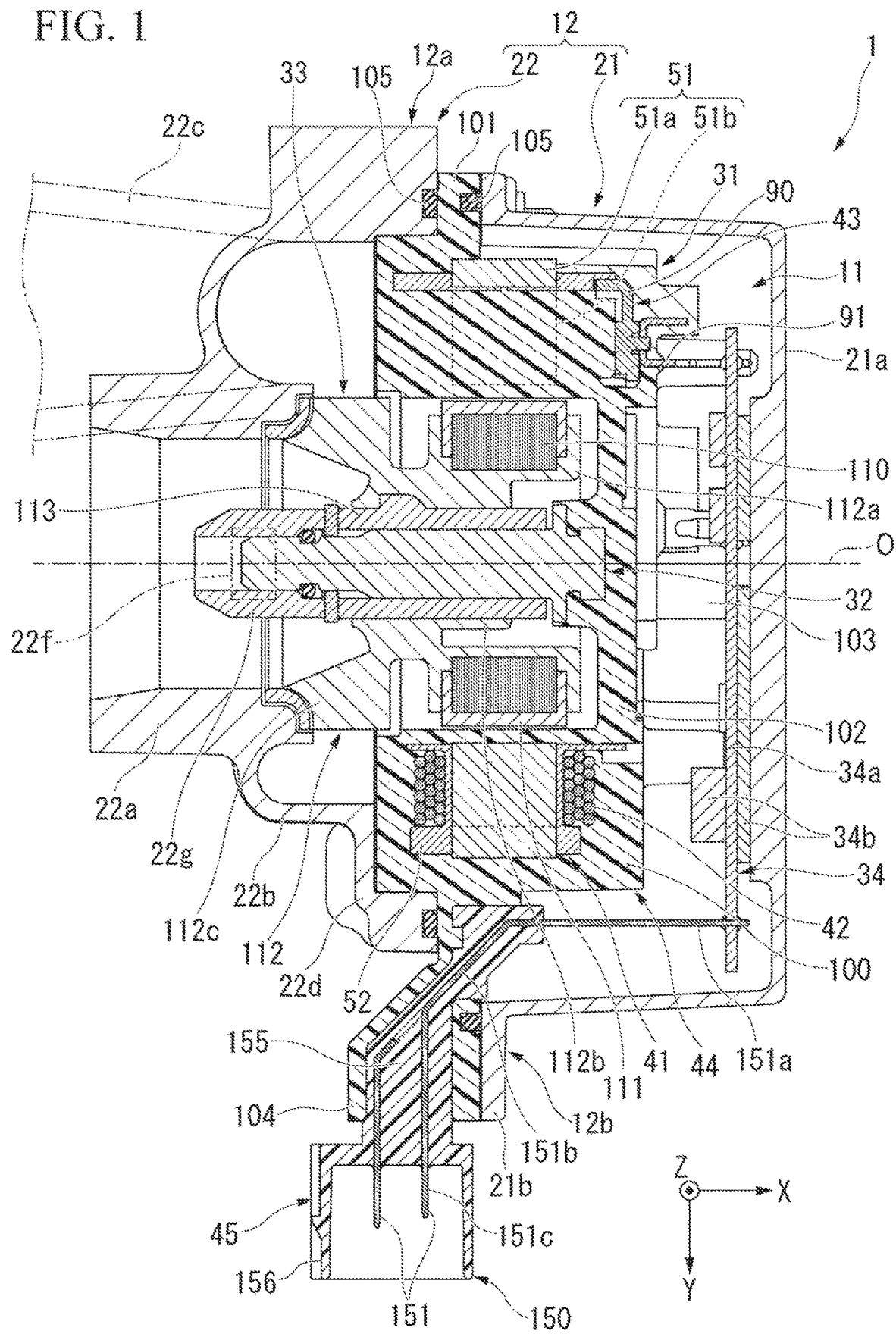
FIG. 1 is a cross-sectional view of an electric water pump according to a first embodiment.

Next, embodiments of the present disclosure will be described with reference to the drawings. In this embodiment, a case in which a connector receiver unit manufacturing method, a connector receiver unit, and an electrical component according to the present disclosure are applied to an electric water pump (hereinafter, referred to as EWP) will be described as an example. In the embodiments or modified examples to be described below, the corresponding configurations may be designated by the same reference numerals and descriptions may be omitted. Additionally, in the following description, for example, expressions indicating relative or absolute arrangement such as "parallel", "orthogonal", "center", and "coaxial" not only expresses such an arrangement strictly, but also expresses a state of being relatively displaced with a tolerance or an angle or distance to the extent that the same function can be obtained.

First Embodiment

[EWP1]

FIG. 1 is a cross-sectional view of a EWP1.

An EWP (electrical component) 1 shown in FIG. 1 is mounted on, for example, a vehicle and the like. The EWP1 is provided at least on a cooling water flow path connecting an engine and a radiator. The EWP1 distributes cooling water between the engine and the radiator. The vehicle may be a hybrid vehicle, a plug-in hybrid vehicle, or the like in addition to a vehicle including only an engine.

The EWP1 includes a pump unit 11 and a housing 12.

The pump unit 11 is, for example, an inner rotor type brushless motor. The pump unit 11 is accommodated in the housing 12. In the following description, a direction along the axis O of the pump unit 11 (shaft 32 to be described later) will be simply referred to as an axial direction, a direction intersecting the axis O when viewed from the axial direction will be referred to as a radial direction, and a direction around the axis O will be referred to as a circumferential direction.

<Housing 12>

The housing 12 accommodates the pump unit 11 and forms part of the cooling water flow path. The housing 12 includes a pump cover 21 and a flow path block 22.

The pump cover 21 covers the pump unit 11 from a first side in the axial direction with respect to the pump unit 11. The pump cover 21 includes a pump accommodation portion 21a and an attachment flange portion 21b. The pump accommodation portion 21a is formed as a bottomed cylinder portion which opens toward a second side in the axial direction. The pump unit 11 is accommodated inside the pump accommodation portion 21a. The attachment flange portion 21b projects radially outward from the opening edge (the second side end edge in the axial direction) of the pump accommodation portion 21a.

The flow path block 22 is overlapped with the pump cover 21 from the second side in the axial direction with the pump unit 11 interposed therebetween. The flow path block 22 includes a suction flow path 22a, a discharge flow path 22b, a connection port 22c, and an attachment flange portion 22d.

The suction flow path 22a is formed in a tubular shape coaxially arranged with the axis O. The suction flow path 22a is connected to a portion located on the upstream side of the EWP1 in the cooling water flow path. A spoke 22f is formed on the inner peripheral surface of the suction flow path 22a. For example, the spoke 22f protrudes radially inward from the radially facing position in the inner peripheral surface of the suction flow path 22a. A hub 22g is provided at the radially inner end portion of each spoke 22f. The hub 22g is formed in a tubular shape arranged coaxially with the axis O. The hub 22g is supported on the axis O by each spoke 22f inside the suction flow path 22a.

The discharge flow path 22b surrounds the periphery of the suction flow path 22a. Specifically, the discharge flow path 22b has a flow path cross-sectional area increasing from one side end portion toward the other side end portion in the circumferential direction.

The connection port 22c is connected to the other end portion of the discharge flow path 22b in the circumferential direction. The connection port 22c extends in a direction separated from the pump cover 21. The connection port 22c is connected to a portion located on the downstream side of the EWP1 in the cooling water flow path.

The attachment flange portion 22d projects radially outward from the outer peripheral edge of the discharge flow path 22b. The housing 12 of this embodiment includes an overlapping portion 12a in which the attachment flange portions 21b and 22d are overlapped with each other in the axial direction and an offset portion 12b in which the attachment flange portions 21b and 22d are radially offset from each other. The pump cover 21 and the flow path block 22 are assembled in the axial direction in such a manner that the attachment flange portions 21b and 22d are fastened to each other by a bolt and the like in the overlapping portion 12a. The offset portion 12b is located at part of the attachment flange portions 21b and 22d in the circumferential direction. The offset portion 12b has a radial gap in such a manner that the attachment flange portion 21b of the pump cover 21 is located on the radial outside with respect to the attachment flange portion 22d of the flow path block 22.

<Pump Unit 11>

Figure 2:
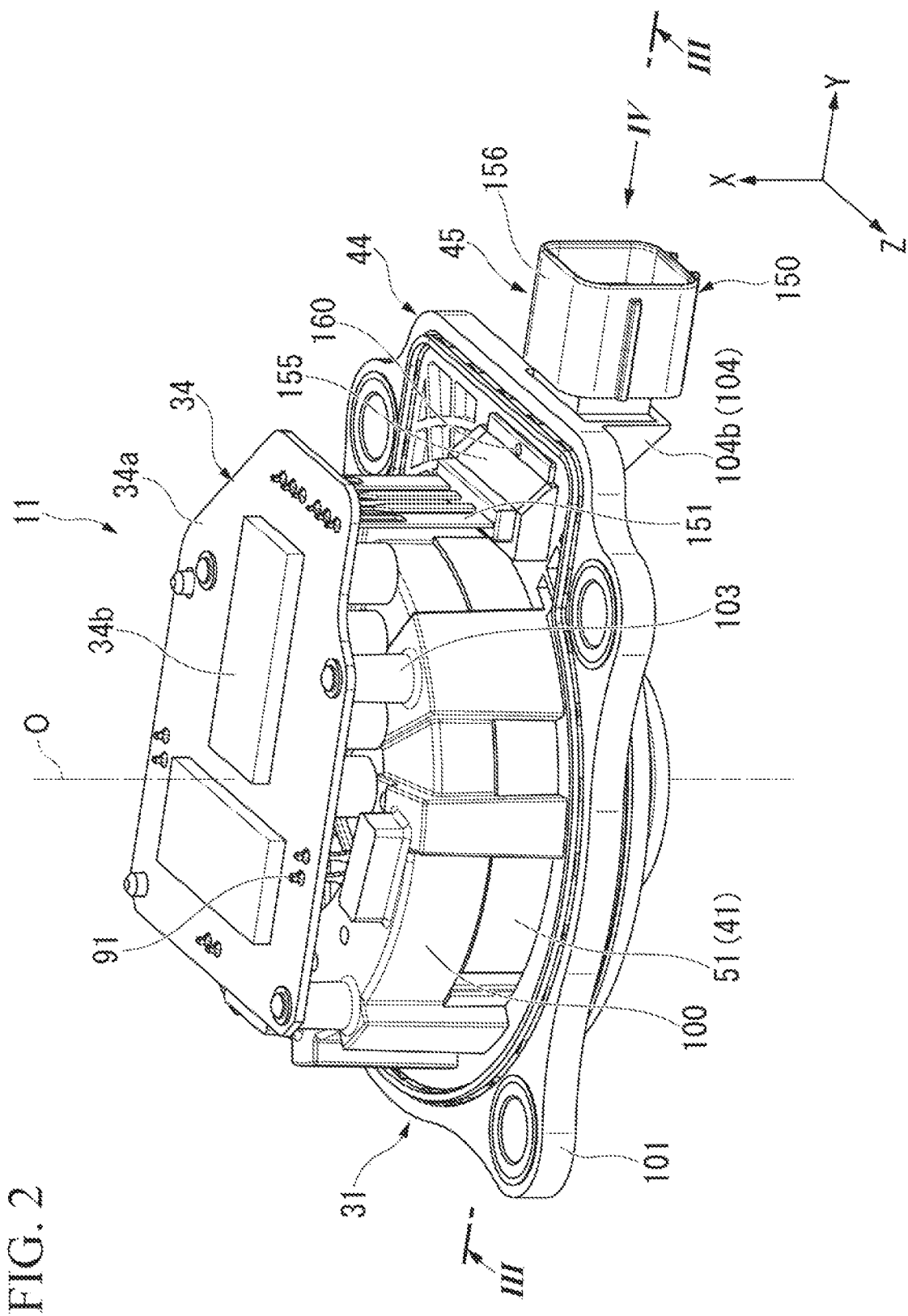
FIG. 2 is a perspective view of a pump unit according to the first embodiment.

FIG. 2 is a perspective view of the pump unit 11.

As shown in FIGS. 1 and 2, the pump unit 11 includes a stator (connector receiver unit) 31, a shaft 32, a rotor 33, and a control board 34.

As shown in FIG. 1, the stator 31 is assembled to the housing 12. The stator 31 includes a stator body 41, a coil (resistor) 42, a terminal unit 43, a stator mold portion (second molding portion) 44, and a connector receiver 45.

<Stator Body 41>

The stator body 41 includes a stator core 51 and an insulator 52.

The stator core 51 is formed in a tubular shape arranged coaxially with the axis O. The stator core 51 is formed by laminating annular plates in the axial direction. The annular plate is formed by punching or the like on an electromagnetic steel sheet. The stator core 51 may be a so-called compressed powder core or split core.

The stator core 51 includes a yoke 51a and a plurality of teeth 51b.

The yoke 51a is formed in a tubular shape arranged coaxially with the axis O.

The teeth 51b protrude radially inward from the inner peripheral surface of the yoke 51a. The plurality of teeth 51b are formed at intervals in the circumferential direction.

The insulator 52 is mounted on the stator core 51 and insulates the stator core SI and a coil 42 from each other. Each insulator 52 surrounds at least the periphery of each of the teeth 51b. The insulator 52 may be integrally formed with the stator core 51 by insert molding or the like.

The coil 42 is configured by winding three-phase coil conductors corresponding to the U phase, the V phase, and the W phase around the teeth 51b via the insulator 52 for each phase.

The terminal unit 43 is disposed on the first side in the axial direction with respect to the stator body 41. The terminal unit 43 electrically connects the coil 42 and the control board 34 to each other. The terminal unit 43 includes a terminal block 90 and a terminal 91.

The terminal block 90 is integrally formed by a resin material or the like. The terminal block 90 is formed in a circular arc shape centered on the axis O when viewed from the axial direction. The terminal block 90 is assembled from the first side in the axial direction with respect to the insulator 52. The terminal block 90 is overlapped with part of the stator body 41 when viewed from the axial direction.

The terminal 91 is formed by, for example, pressing a plate material such as a conductive metal. The terminal 91 is fixed to the terminal block 90 while protruding in the first direction of the axial direction. Three terminals 91 are provided at intervals in the circumferential direction corresponding to the coil conductors of each phase. The coil conductor of each phase is connected to each terminal 91.

As shown in FIGS. 1 and 2, a stator mold portion 44 is formed by molding with a resin material while the stator body 41, the coil 42, and the terminal unit 43 are assembled. The stator mold portion 44 includes a stator covering portion 100, an attachment piece 101, a shaft support wall 102, a spacer portion 103, and a connector covering portion 104.

The stator covering portion 100 is formed in a tubular shape extending coaxially with the axis O. The stator covering portion 100 integrally covers the stator body 41, the coil 42, and the terminal unit 43. Part of the outer peripheral surface of the stator core 51 and part of the terminal 91 are exposed to the outside from the stator covering portion 100. The terminal 91 protrude, from the stator covering portion 100 toward the first side in the axial direction.

The attachment piece 101 projects radially outward from the second side end portion of the stator covering portion 100 in the axial direction. The attachment piece 101 are sandwiched between the attachment flange portions 21*b* and 22*d* of the pump cover 21 and the flow path block 22. The attachment piece 101 is fastened together with the attachment flange portions 21*b* and 22*d* in the overlapping portion 12*a* of the housing 12. Packings 105 are respectively provided between the attachment piece 101 and the attachment flange portion 21*b* of the pump cover 21 and between the attachment piece 101 and the attachment flange portion 22*d* of the flow path block 22. Accordingly, a gap between the pump cover 21 and the flow path block 22 is sealed.

The shaft support wall 102 closes the first side opening portion in the axial direction of the stator covering portion 100.

The spacer portion 103 protrudes from the stator covering portion 100 toward the first side in the axial direction. A plurality of the spacer portions 103 are provided at intervals in the circumferential direction. The description of the connector covering portion 104 or the connector receiver 45 will be made later.

<Shaft 32>

The shaft 32 penetrates the inside of the stator body 41 in the axial direction. The first side end portion of the shaft 32 in the axial direction is integrally molded by the shaft support wall 102. The second side end portion of the shaft 32 in the axial direction is supported by the hub 22*g* of the flow path block 22.

<Rotor 33>

The rotor 33 is rotatably supported by the shaft 32 inside the stator core 51. The rotor 33 includes a rotor cote 110, a plurality of magnets (not shown), a magnet cover 111, a rotor mold portion 112, and a bush 113.

The rotor core 110 is formed in a tubular shape arranged coaxially with the axis O. The rotor core 110 is formed by laminating annular plates in the axial direction. The annular plate is formed by punching or the like on an electromagnetic steel sheet.

The magnets are provided side by side on the outer peripheral surface of the rotor core 110 in the circumferential direction. The magnets are arranged so that the magnetic poles facing in the radial direction are opposite poles between the magnets adjacent to each other in the circumferential direction.

The magnet cover 111 is mounted on the rotor core 110 from the radial outside. The magnet cover 111 covers the magnet from the outside in the radial direction and both sides in the axial direction. The magnet faces the stator core 51 in the radial direction with the magnet cover 111 interposed therebetween.

The rotor mold portion 112 includes a rotor covering portion 112*a*, a connection portion 112*b*, and an impeller portion 112*c*.

The rotor covering portion 112*a* is formed in a tubular shape extending coaxially with the axis O. The rotor covering portion 112*a* integrally covers the rotor core 110, the magnet, or the magnet cover 111. The outer peripheral portion of the magnet cover 111 is exposed from the rotor covering portion 112*a*.

The connection portion 112*b* extends radially inward from the rotor covering portion 112*a*. The connection portion 112*b* is formed in a tubular shape along the axis O. The second side end portion of the connection portion 112*b* in the axial direction protrudes in the axial direction with respect to the rotor covering portion 112*a*.

The impeller portion 112*c* projects radially outward from the second side end portion of the connection portion 112*b* in the axial direction. The impeller portion 112*c* are exposed to both the suction flow path 22*a* and the discharge flow path 22*b*.

The bush 113 is integrally fixed to the connection portion 112*b* inside the connection portion 112*b*. The bush 113 is formed in a tubular shape arranged coaxially with the axis O. The shaft 32 penetrates through the bush 113. The bush 113 is rotatably supported by the shaft 32. Thus, the rotor 33 is rotatably supported by the shaft 32 through the bush 113.

<Control Board 34>

The control board 34 is disposed on the first side in the axial direction with respect to the stator body 41 inside the pump cover 21. The control board 34 is configured by mounting a plurality of electronic components 34*b* on the front and rear surfaces of the board body 34*a*. The control board 34 is overlapped on the stator body 41 with the thickness direction of the board body 34*a* as the axial direction. Specifically, the control board 34 is fastened to the spacer portion 103 by a screw or the like while the board body 34*a* is supported by the spacer portion 103 on the second side in the axial direction. The terminal 91 is connected to the board body 34*a*.

<Connector Receiver 45>

The connector receiver 45 electrically connects the control board 34 to an external power supply when a connector 180 (see FIG. 3) extending from the external power supply (battery or the like) is removably mounted thereon. The connector receiver 45 is integrally formed as the stator 31 by being molded into the stator mold portion 44. Specifically, the connector receiver 45 is exposed inside and outside the housing 12 by penetrating a portion corresponding to the offset portion 12*b* in the attachment piece 101.

Figure 3:
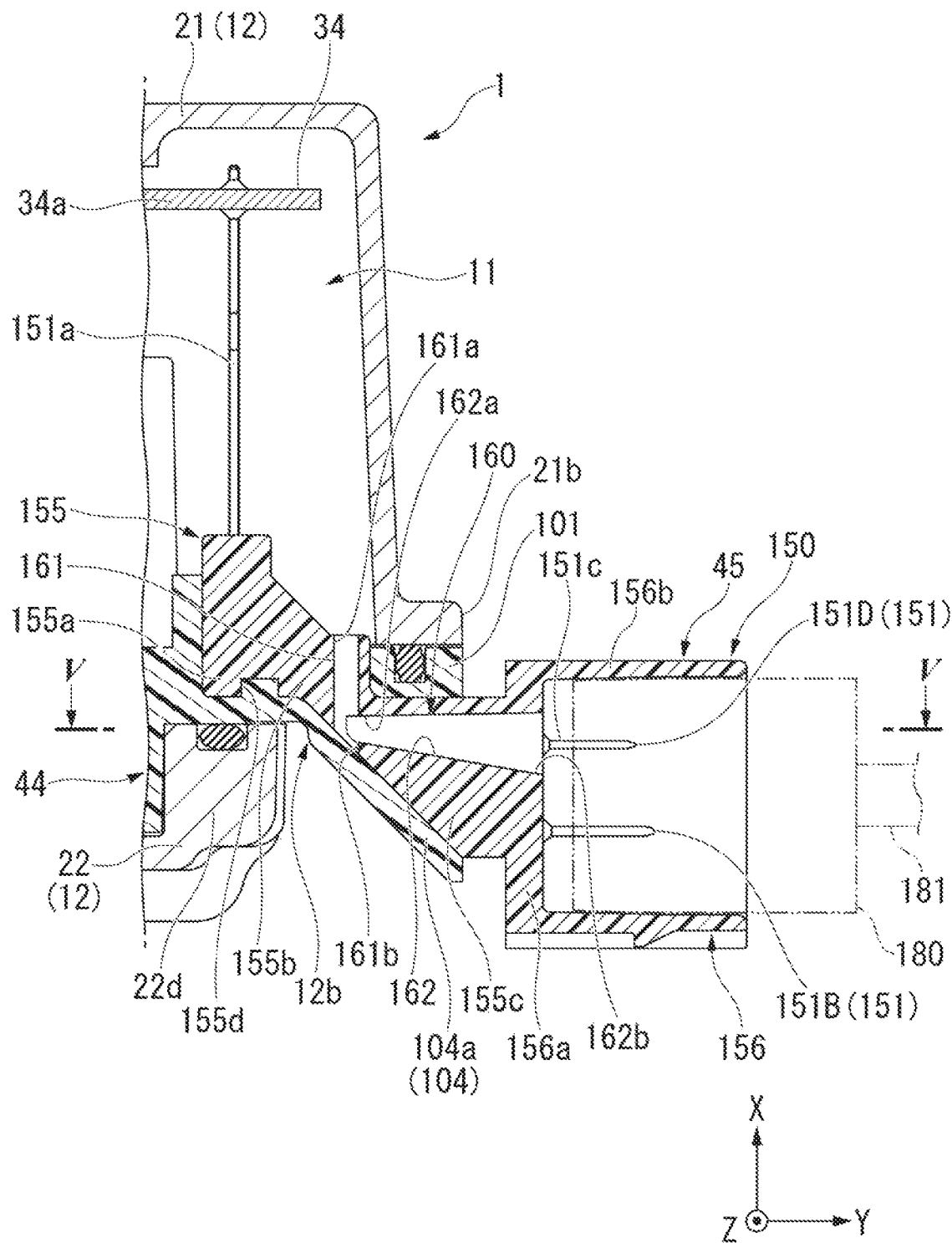
FIG. 3 is an enlarged cross-sectional view of a portion corresponding to a line III-III of FIG. 2.
Figure 4:
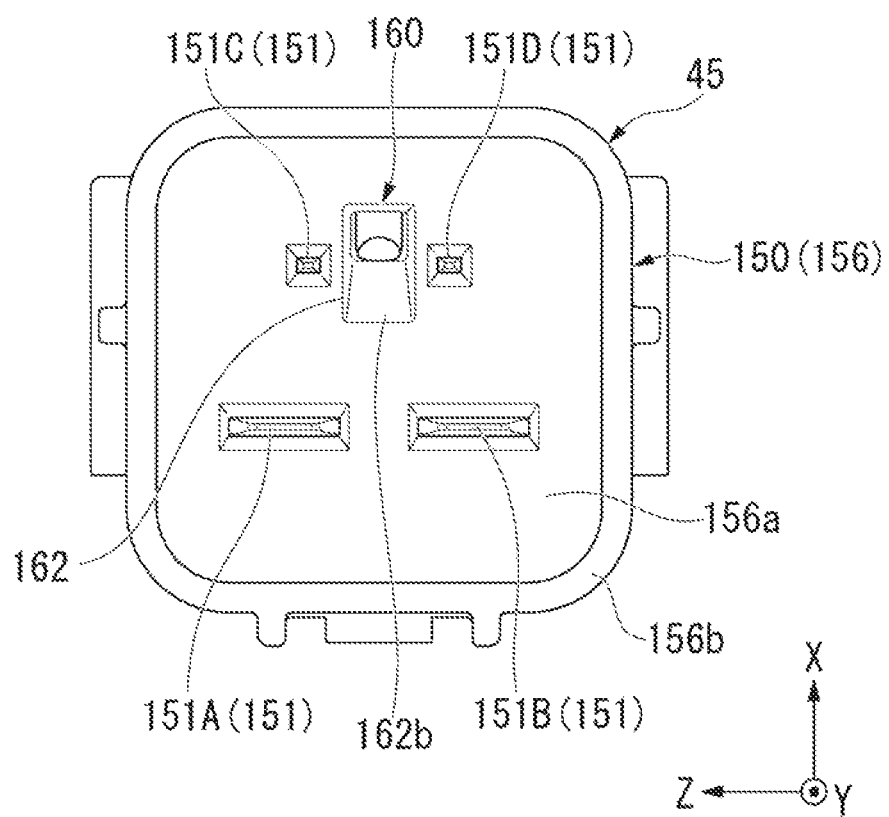
FIG. 4 is a view seen from IV in FIG. 2.
Figure 5:
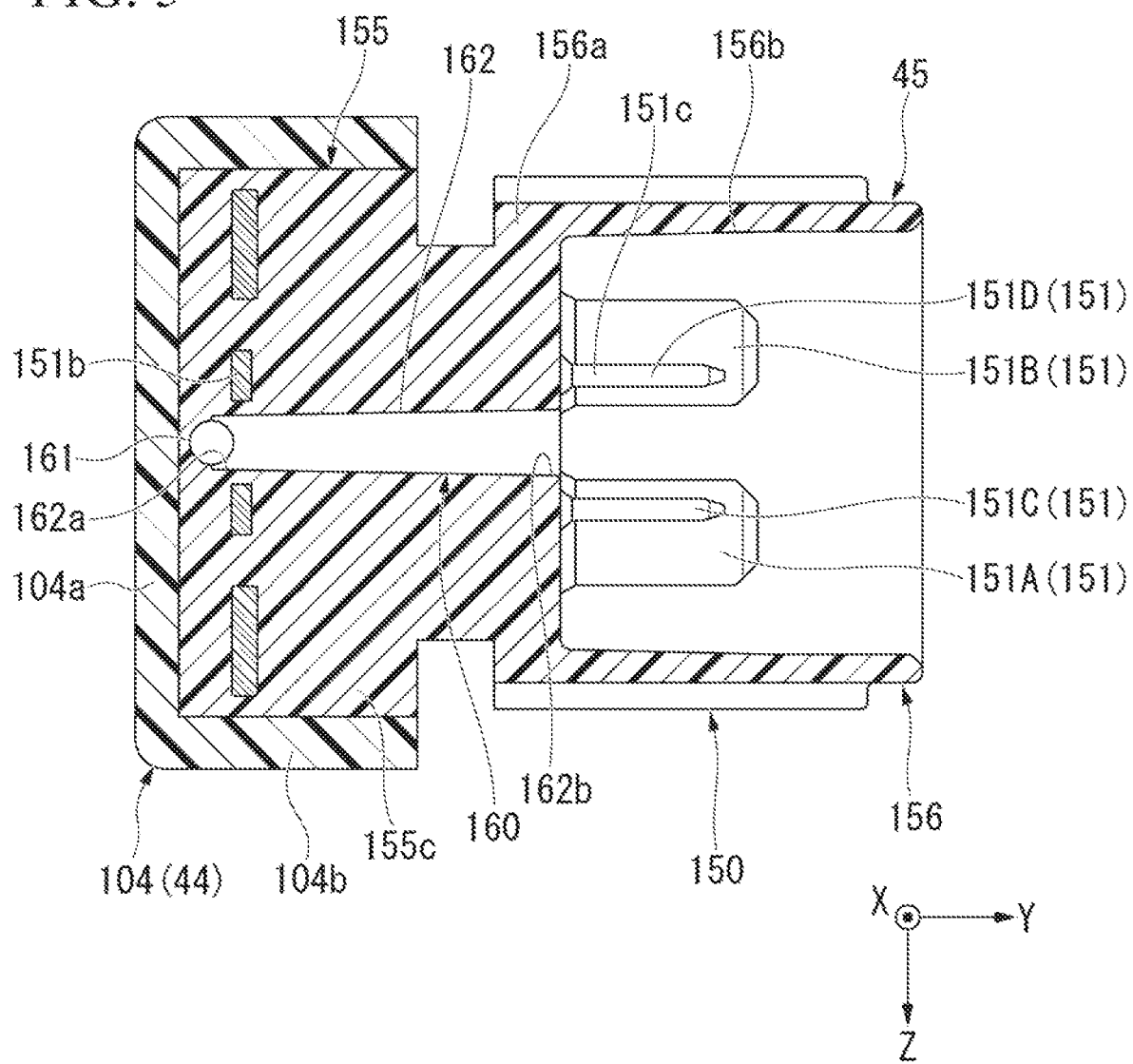
FIG. 5 is a cross-sectional view corresponding to a line V-V of FIG. 3.

FIG. 3 is an enlarged cross-sectional view of a portion corresponding to a line III-III of FIG. 2. FIG. 4 is a view seen from IV of FIG. 2. FIG. 5 is a cross-sectional view corresponding to a line V-V of FIG. 3.

As shown in FIGS. 3 to 5, the connector receiver 45 includes a connector molding portion (first molding portion) 150 and a plurality of receiver side terminals 151.

As shown in FIG. 3, the connector molding portion 150 is formed by molding the plurality of receiver side terminals 151 by a resin material. The resin material forming the connector molding portion 150 is the same as the resin material forming the stator mold portion 44. However, the resin material forming the connector molding portion 150 may be different from the resin material forming the stator mold portion 44.

The connector molding portion 150 includes a base portion 155 and a mounting portion 156.

The base portion 155 extends inside and outside the housing 12 through a gap between the attachment flange portions 21b and 22d in the offset portion 12b. The base portion 155 extends from the first side toward the second side in the axial direction as it goes radially outward. Specifically, the base portion 155 includes an inner support portion 155a, a connection portion 155b, and an outer support portion 155c.

The inner support portion 155a is a portion which is exposed inside the housing 12 in the base portion 155. Specifically, the inner support portion 155a protrudes toward the first side in the axial direction while being partially embedded in a portion located inside the housing 12 in the attachment piece 101.

The connection portion 155b extends toward the second side in the axial direction radially outward from the inner support portion 155a. The connection portion 155b penetrates the attachment piece 101 in the axial direction. A surface facing at least the first side in the axial direction of the outer surface of the connection portion 155b is an exposed surface which is not covered with the stator mold portion 44. The exposed surface of the connection portion 155b is exposed inside the housing 12. A recess 155d which is depressed toward the first side in the axial direction is formed at the boundary portion between the connection portion 155b and the inner support portion 155a. Part of the attachment piece 101 is embedded in the recess 155d.

The outer support portion 155c extends to the radial outside from the second side end portion of the connection portion 155b in the axial direction. The outer support portion 155c has an axial length gradually increasing as it goes radially outward. The radially outer end portion of the outer support portion 155c is located on the radial outside in relation to the attachment flange portion 21b.

The mounting portion 156 extends radially outward from the outer support portion 155c. The mounting portion 156 is formed in a bottomed tubular shape that opens radially outward. Specifically, the mounting portion 156 includes a bottom wall portion 156a and a peripheral wall portion 156b.

The bottom wall portion 156a projects toward the outer peripheral side with respect to the outer support portion 155c. Additionally, a surface facing the radial outside in the bottom wall portion 156a and the outer support portion 155c constitutes the bottom surface of the mounting portion 156.

The peripheral wall portion 156b is formed in a square tubular shape extending radially outward from the outer peripheral edge of the bottom wall portion 156a. The peripheral wall portion 156b surrounds the periphery of the bottom wall portion 156a.

A receiver side terminal 151 is provided to penetrate the connector molding portion 150. The receiver side terminal 151 is formed by, for example, pressing a plate material such as a conductive metal. In the examples of FIGS. 4 and 5, the receiver side terminal 151 includes four terminals such as a power terminal 151A, a ground terminal 151B, a signal output terminal 151C, and a signal input terminal 151D. In the following description, when it is not necessary to distinguish each receiver side terminal 151, they will be collectively referred to as the receiver side terminal 151.

As shown in FIGS. 1 and 3, the receiver side terminal 151 includes a board connection portion (first end portion) 151a, an embedded portion 151b, and a connector connection portion (second end portion) 151c.

The board connection portion 151a protrudes from the inner support portion 155a toward the first side of the axial direction. The front end portion of the board connection portion 151a is connected to the board body 34a. In the example of FIG. 2, the board connection portions 151a are arranged side by side in each receiver side terminal 151.

As shown in FIGS. 1 and 5, the embedded portion 151b is a portion which is embedded in the base portion 155 in the receiver side terminal 151. Specifically, the embedded portion 151b extends radially outward as it goes from the base end portion of the board connection portion 151a toward the second side in the axial direction and further extends radially outward. The embedded portion 151b reaches the bottom surface of the mounting portion 156.

As shown in FIG. 4, the connector connection portion 151c protrudes from the embedded portion 151b toward the inside of the mounting portion 156. At the inside of the mounting portion 156, in the connector connection portion 151c, the signal output terminal 151C and the signal input terminal 151D) are arranged in two rows together with the power terminal 151A and the ground terminal 151B. The layout of the board connection portion 151a or the connector connection portion 151c can be appropriately changed.

As shown in FIGS. 3 to 5, the connector molding portion 150 is provided with a communication hole 160 which communicates the inside and outside of the housing 12. The communication hole 160 is formed in an L shape or a T shape by a first concave portion 161 and a second concave portion 162 extending to be orthogonal to each other. In the following description, the extension direction of the first concave portion 161 may be the X direction, the extension direction of the second concave portion 162 may be the Y direction, and the direction orthogonal to the X direction and the Y direction is the Z direction. The X direction matches the axial direction and the Y direction matches the radial direction.

The first concave portion 161 extends through the base portion 155 in a linear shape in the X direction (axial direction). The first concave portion 161 is formed to have a circular cross-section orthogonal to the X direction. The first concave portion 161 is formed to have a constant inner diameter over the entire length in the X direction. However, the first concave portion 161 may be formed in a tapered shape.

The first concave portion 161 penetrates the connection portion 155b in the X direction. Specifically, the first concave portion 161 includes an inner opening (first opening, opening portion) 161a which opens to the exposed surface of the connection portion 155b. The first concave portion 161 includes an outer opening (penetration hole, opening portion) 161b which opens on the surface (hereinafter, referred to as the rear surface) facing the side opposite to the exposed surface in the connection portion 155b.

The second concave portion 162 extends through the base portion 155 in a linear shape in the Y direction. The second concave portion 162 is formed to have a rectangular cross-section orthogonal to the Y direction. The second concave portion 162 is formed in a tapered shape so that a cross-sectional shape gradually increases as it goes from the −Y side toward the +Y side (from the inside to the outside in the radial direction). The second concave portion 162 may be formed to have a uniform cross-sectional shape over the entire length in the radial direction.

The second concave portion 162 includes a communication opening (communication portion) 162a which opens inside the first concave portion 161 at the −Y side end portion. The communication opening 162a is connected to a portion near an outer opening 161b centered on the X direction in the first concave portion 161. The second concave portion 162 communicates with the inside of the first concave portion 161 through the communication opening 162a. The second concave portion 162 includes a bottom surface opening (second opening) 162b which opens on the bottom surface of the mounting portion 156 at the +Y side end portion. The bottom surface opening 162b opens at a portion located between the signal output terminal 151C and the signal input terminal 151I) on the bottom surface of the mounting portion 156. The second concave portion 162 opens toward the +Y side inside the mounting portion 156.

As shown in FIG. 5, the length of the communication opening 162a in the Z direction is larger than the length (inner diameter) of the first concave portion 161 in the Z direction. Thus, the communication opening 162a surrounds the first concave portion 161 from both sides in the Z direction.

As shown in FIGS. 3 and 5, in the stator mold portion 44, the above-described connector covering portion 104 is drawn to the outside of the housing 12 while being integrally connected to the attachment piece 101. The connector covering portion 104 surrounds the periphery of the base portion 155 outside the housing 12. Specifically, the connector covering portion 104 includes a rear surface covering portion (plug portion) 104a and a side surface covering portion 104b.

The rear surface covering portion 104a covers a portion reaching the rear surface of the outer support portion 155c from the rear surface of the connection portion 155b. The rear surface covering portion 104a closes the outer opening 161b. Thus, the communication hole 160 opens inside the housing 12 through the inner opening 161a and opens inside the mounting portion 156 through the bottom surface opening 162b. Additionally, part of the rear surface covering portion 104a may enter the first concave portion 161 in a range in which the communication between the first concave portion 161 and the second concave portion 162 through the communication opening 162a is not interrupted. A portion that enters the first concave portion 161 in the rear surface covering portion 104a is preferably included between the surface located on the +X side of the inner surface of the second concave portion 162 from the opening edge of the outer opening 161b and is more preferably included in the surface located on the -X side of the inner surface of the second concave portion 162 from the opening edge of the outer opening 161b. Accordingly, the interruption between the first concave portion 161 and the second concave portion 162 can be suppressed and the inside and outside of the housing 12 can be communicated with each other through the communication hole 160.

The side surface covering portion 104b covers each of the surfaces facing both sides of the connection portion 155b and the outer support portion 155c in the Z direction. The side surface covering portion 104b bridges between the rear surface covering portion 104a and the attachment piece 101.

As shown in FIG. 3, the connector 180 is removably mounted on the mounting portion 156. An insertion opening (not shown) is formed in a surface facing the bottom surface of the mounting portion 156 in the connector 180. Each receiver side terminal 151 is separately inserted into the insertion opening while the connector 180 is mounted on the mounting portion 156. A connection terminal (not shown) which is separately connected to the receiver side terminal 151 while the receiver side terminal 151 is inserted into the insertion opening is provided inside the connector 180. Each connection terminal is connected to the external power supply via a wiring. The wiring is routed to the external power supply while being bound by a sleeve 181 or the like.

In this embodiment, the connector 180 is preferably fitted to the mounting portion 156 through a seal ring or the like (not shown). Accordingly, the entry of dust and the like into the mounting portion 156 through a gap between the inner peripheral surface of the mounting portion 156 and the outer peripheral surface of the connector 180 is restricted. The inner space of the mounting portion 156 is opened to the atmosphere through the sleeve 181 or the insertion opening of the connector 180.

Next, the operation of the EWP1 will be described.

In the EWP1 of this embodiment, a current is supplied from the external power supply to the control board 34 via the connector receiver 45. The current supplied to the control board 34 is supplied to the coil 42 of each phase via the terminal 91 at a predetermined timing by the operation of the electronic component 34b. When a current is supplied to the coil 42, a magnetic field is formed in the stator core 51 and a magnetic attraction force or repulsive force is generated between the magnet of the rotor 33 and the stator core 51. Accordingly, the rotor 33 rotates with respect to the stator 31.

By the rotation of the rotor 33, a centrifugal force is applied to the cooling water flowing into the suction flow path 22a due to the impeller portion 112c. By this centrifugal force, the cooling water is sent out to the downstream side through the discharge flow path 22b.

A pressure difference is generated inside and outside the housing 12 depending on the usage status and environment of EWP1. For example, when the pressure on the inside of the housing 12 is higher than the pressure on the outside of the housing 12, the gas inside the housing 12 is discharged to the outside of the housing 12 through the communication hole 160. When the pressure on the inside of the housing 12 is lower than the pressure on the outside of the housing 12, the gas on the outside of the housing 12 flows into the housing 12 through the communication hole 160. In the EWP1, since the gas inside and outside the housing 12 enters and exists through the communication hole 160, the differential pressure inside and outside the housing 12 is relaxed. Particularly, in this embodiment, since the communication hole 160 opens to the inner space of the mounting portion 156 through the bottom surface opening 162b, the entry of dust or liquid into the housing 12 can be suppressed.

[Method of Manufacturing Stator 31]

Figure 6:
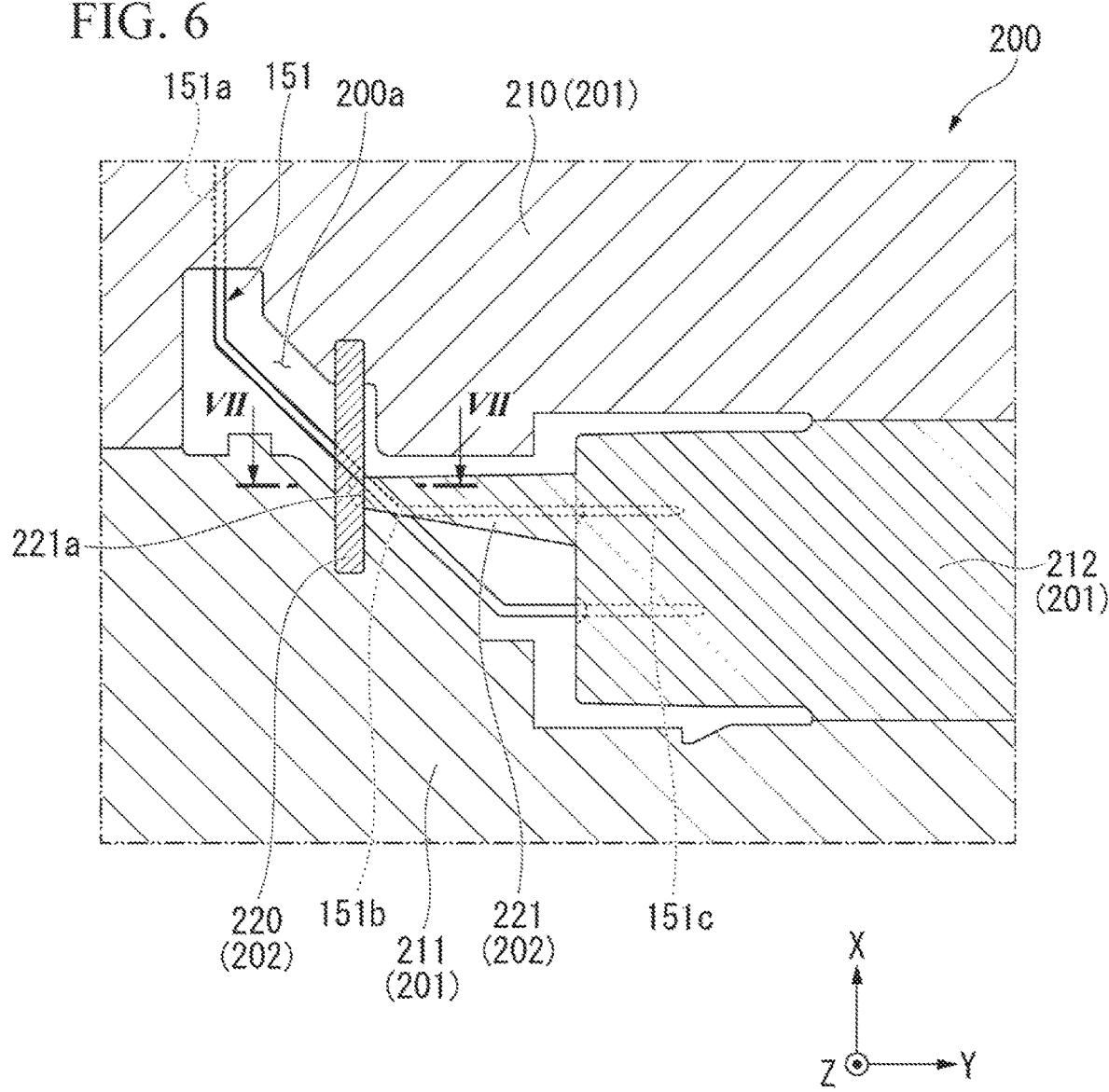
FIG. 6 is a process diagram of a first molding step in a stator manufacturing method according to the first embodiment.

Next, a method of manufacturing the stator 31 will be described. FIG. 6 is a process diagram of a first molding step in the method of manufacturing the stator 31.

The stator 31 is manufactured by the first molding step and the second molding step (closing step).

In the first molding step, the connector receiver 45 is formed. In the first molding step, each receiver side terminal 151 is set inside a first molding die 200 to mold each receiver side terminal 151. The first molding die 200 includes a mold body 201 which forms a cavity 200a and a molding pin 202 which molds the communication hole 160.

The mold body 201 includes an upper die 210, a lower die 211, and a slide die 212.

The upper die 210 and the lower die 211 are portions which mold the outer surface of the connector molding portion 150 and are provided to face each other in the X direction. For example, the upper die 210 is provided to be movable in the X direction with respect to the lower die 211. The upper die 210 holds the board connection portion 151a of the receiver side terminal 151 when clamping the first molding die 200.

The slide die 212 is a portion which molds the inner surface of the mounting portion 156. The slide die 212 is provided to be movable in the Y direction with respect to the upper die 210 and the lower die 211. The slide die 212 holds the connector connection portion 151c of the receiver side terminal 151 when clamping the first molding die 200.

The molding pin 202 includes a first pin 220 (one pin) which molds the first concave portion 161 and a second pin (other pin) 221 which molds the second concave portion 162.

The first pin 220 is formed in a columnar shape. The first pin 220 penetrates the cavity 200a in the X direction during clamping and is bridged between the upper die 210 and the lower die 211. The first pin 220 may be provided to be movable together with the upper die 210 and may be supported by the lower die 211 during clamping. The first pin 220 may be integrally provided with the lower die 211 and may be supported by the upper die 210 during clamping.

The second pin 221 protrudes from the slide die 212 toward the −Y side in a cantilevered manner. The second pin 221 is formed in a prismatic shape that gradually tapers toward the −Y side.

Figure 7:
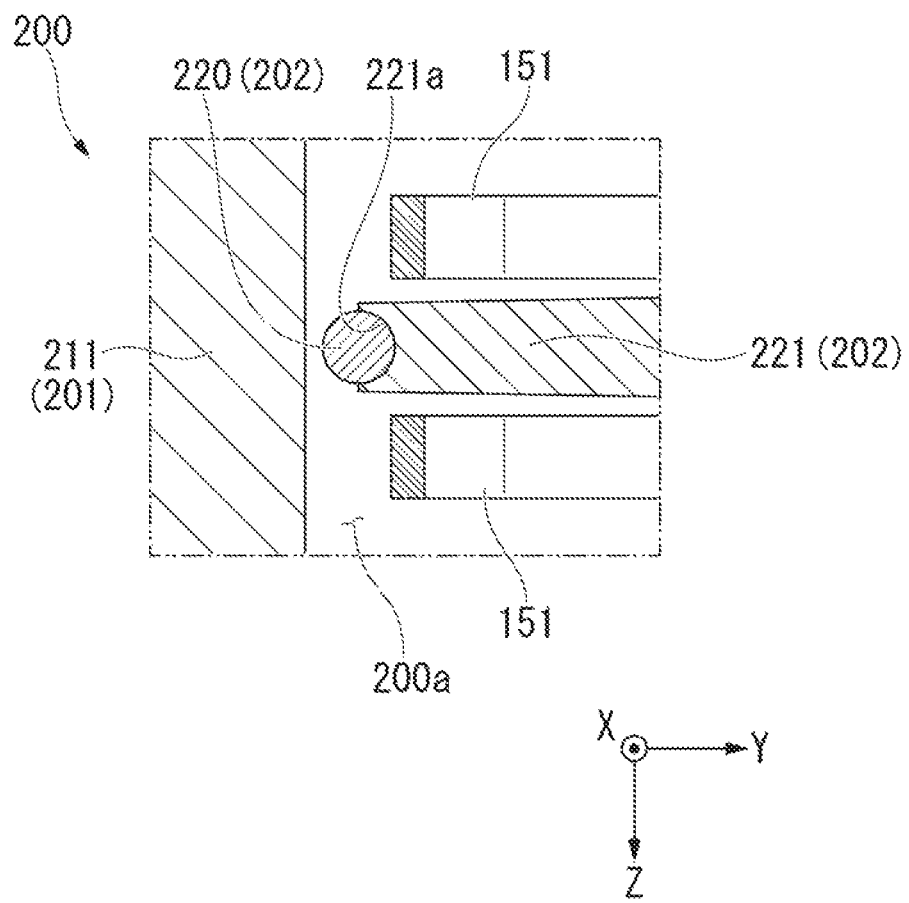
FIG. 7 is a cross-sectional view corresponding to a line VII-VII of FIG. 6.

FIG. 7 is a cross-sectional view corresponding to a line VII-VII of FIG. 6.

As shown in FIG. 7, the length in the Z direction at the −Y side end portion of the second pin (the large-length pin) 221 is larger than the outer diameter of the first pin (the small-length pin) 220. An engagement portion 221a is formed at the −Y side end portion (the other end portion) of the second pin 221. The engagement portion 221a penetrates the second pin 221 in the X direction. The engagement portion 221a is formed in a semicircular shape which is depressed along the outer peripheral surface of the first pin 220 when viewed from the X direction. The outer peripheral surface of the first pin 220 abuts against the inner peripheral surface of the engagement portion 221a during clamping. In this state, when part of the first pin 220 is accommodated inside the engagement portion 221a, the movement of the second pin 221 in the Z direction with respect to the first pin 220 is restricted.

As shown in FIG. 6, when performing the first molding step using the first molding die 200, the receiver side terminal 151 is set in the first molding die 20M and the first molding die 200 is clamped. In a state in which the embedded portion 151b of the receiver side terminal 151 penetrates the cavity 200a, the board connection portion 151a is held by the upper die 210 and the connector connection portion 151c is held by the slide die 212. In accordance with the clamping, the first pin 220 is supported between the upper die 210 and the lower die 211 at both sides. On the other hand, the second pin 221 is supported between the slide die 212 and the first pin 220 at both sides when the engagement portion 221a engages with the first pin 220.

After clamping the first molding die 200, a molten resin material is filled into the cavity 200a of the first molding die 200. Then, the resin material is filled into the cavity 200a to cover the periphery of the receiver side terminal 151 and the molding pin 202. When the resin material is solidified, the connector molding portion 150 (see FIG. 3) is injection-molded as a primary molded product.

After the resin material is solidified, the first molding die 200 is opened. Specifically, the slide die 212 is moved to the +Y side after the holding of the connector connection portion 151c is canceled. Then, when the second pin 221 moves to the +Y side along with the slide die 212, the second pin 221 is pulled out from the connector molding portion 150. After the holding of the board connection portion 151a is canceled, the upper die 210 is moved to the +X side. Then, when the first pin 220 moves to the +X side along with the upper die 210, the first pin 220 is pulled out from the connector molding portion 150. Accordingly, the first concave portion 161 is formed in a portion in which the first pin 220 is retracted in the connector molding portion 150 and the second concave portion 162 is formed in a portion in which the second pin 221 is retracted.

Figure 8:
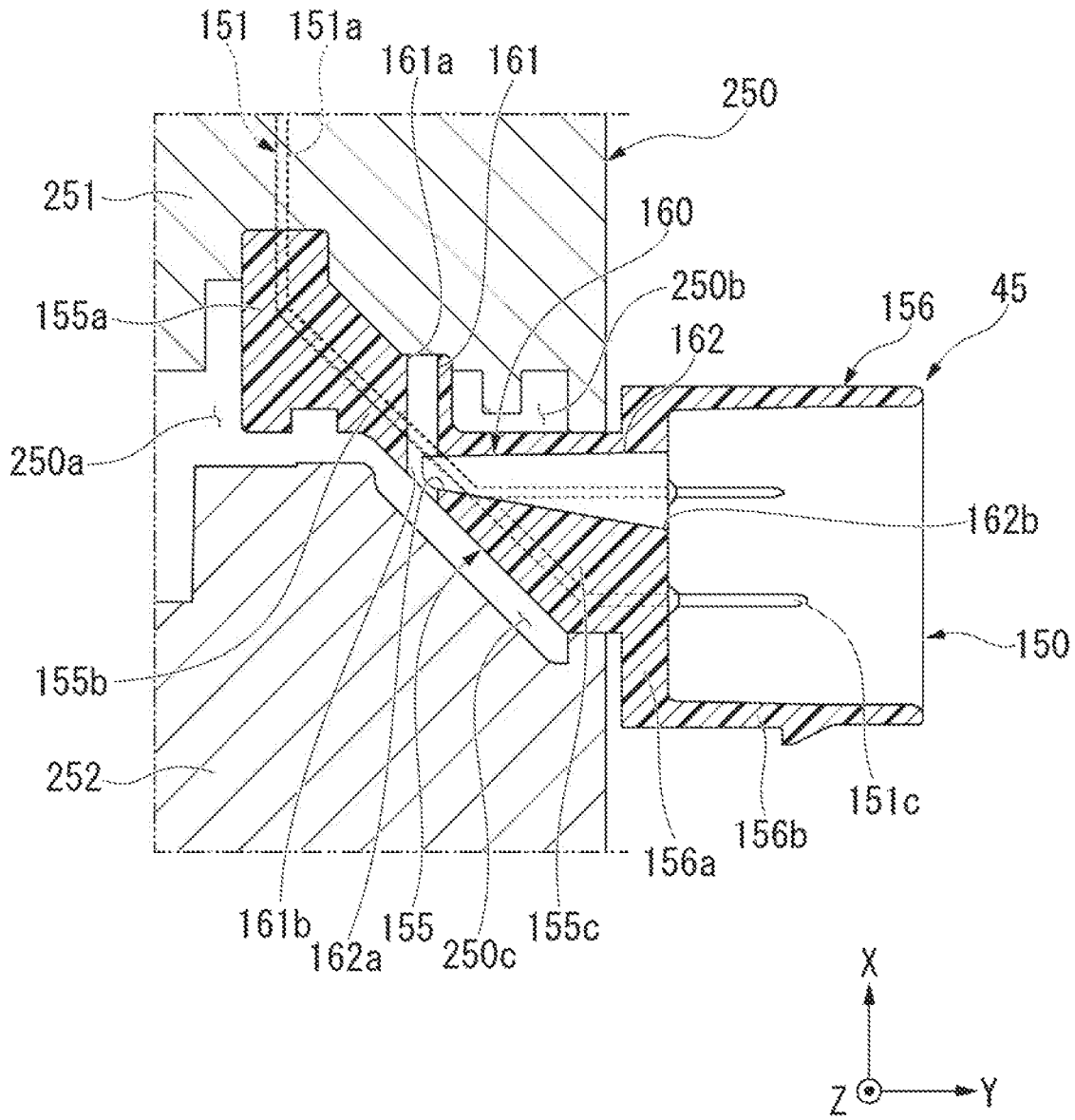
FIG. 8 is a process diagram illustrating a second molding step.

FIG. 8 is a process diagram illustrating the second molding step. In the following description, the periphery of the connector receiver 45 in the second molding step will be mainly described.

In the second molding step, the stator body 41, the coil 42, the terminal unit 43, and the connector receiver 45 are set as molded products in a second molding die 250 and are integrally molded by a resin material.

The second molding die 250 includes an upper die 251 and a lower die 252. The upper die 251 and the lower die 252 hold a portion reaching the mounting portion 156 from the outer support portion 155c of the connector molding portion 150 during clamping. The cavity 250a of the second molding die 250 includes an attachment piece molding portion 250b or a covering portion molding portion 250c. The attachment piece molding portion 250b is a space which is located on the +X side with respect to the outer support portion 155c in the second molding die 250. The covering portion molding portion 250c is a space which surrounds both sides in the Z direction and the −X side with respect to the outer support portion 155c in the second molding die 250. The outer opening 161b of the first concave portion 161 opens to the covering portion molding portion 250c.

When performing the second molding step using the second molding die, each molded product is set in the second molding die 250 and the second molding die 250 is clamped. After clamping the second molding die 250, the molten resin material is filled into the cavity 250a of the second molding die 250. Then, the resin material is filled into the cavity 250a to cover the periphery of each molded product. At this time, when the resin material is also filled into the attachment piece molding portion 250b or the covering portion molding portion 250c, the periphery of the base portion 155 is covered with the resin material. That is, the outer opening 161b of the first concave portion 161 is closed by the resin material. Then, when the resin material is solidified, the stator mold portion 44 is injection-molded.

When the second molding die 250 is opened after the resin material is solidified, the stator 31 is formed as a secondary molded product. That is, the stator 31 is formed while the outer opening 161b of the first concave portion 161 is closed by the stator mold portion 44.

In this way, in this embodiment, in the first molding step, both end portions of the first pin 220 are supported by the first molding die 200 (the upper die 210 and the lower die 211), one end portion of the second pin 221 is supported by the first molding die 200 (the slide die 212), and the other end portion of the second pin 221 is supported by the first pin 220.

According to this configuration, since both end portions of the first pin 220 are supported by the first molding die 200, it is easy to ensure the strength of the first pin 220 against the injection pressure or the like. Accordingly, it is possible to suppress the displacement or the deformation of the first pin 220. In accordance with this, since the second pin 221 can easily abut against the first pin 220, it is possible to easily align the first pin 220 and the second pin 221 with high accuracy. Thus, it is possible to improve the shape accuracy or manufacturing efficiency of the communication hole 160 and to improve the durability of the first molding die 200 compared to the conventional configuration in which the front end portions of the rods abut against each other.

In this embodiment, the outer opening 161b of the first concave portion 161 is closed by molding the connector molding portion 150 by the stator mold portion 44 in the second molding step.

According to this configuration, it is possible to reliably and simply close the outer opening 161b compared to a configuration in which a separate member is fitted into the outer opening 161b of the first concave portion 161.

In this embodiment, the stator mold portion 44 includes the stator covering portion 100 which covers the coil 42 in the housing 12.

According to this configuration, since the connector receiver 45 of this embodiment can form the communication hole 160 in a desired shape with high accuracy as described above, a gas can efficiently enters and exits inside and outside the housing 12 through the communication hole 160. Therefore, even when a temperature difference inside and outside the housing 12 occurs due to the heating of the coil 42, it is possible to promptly relax the differential pressure inside and outside the housing 12 in accordance with the temperature difference.

In this embodiment, the cross-sectional area of the second concave portion 162 gradually increases as it goes from the communication opening 162a toward the bottom surface opening 162b.

According to this configuration, the second pin 221 for molding the second concave portion 162 can be formed in a tapered shape as it goes from the front end portion toward the base end portion. Accordingly, since the tapered shape can be used as a pull-out taper of the second pin 221, the releasability can be improved.

In this embodiment, the second pin 221 is configured to accommodate the first pin 220 and to form the engagement portion 221a that restricts the movement of the first pin 220 with respect to the second pin 221.

According to this configuration, it is easy to suppress the displacement or the like of the first pin 220 and the second pin 221 due to the injection pressure or the like during molding. Therefore, it is possible to form the communication hole 160 with higher accuracy.

Since the EWP1 of this embodiment includes the stator 31 of this embodiment, it is possible to suppress atmospheric pressure fluctuations in the housing 12 and to provide the EWP1 with excellent durability and operational reliability.

Second Embodiment

Figure 9:
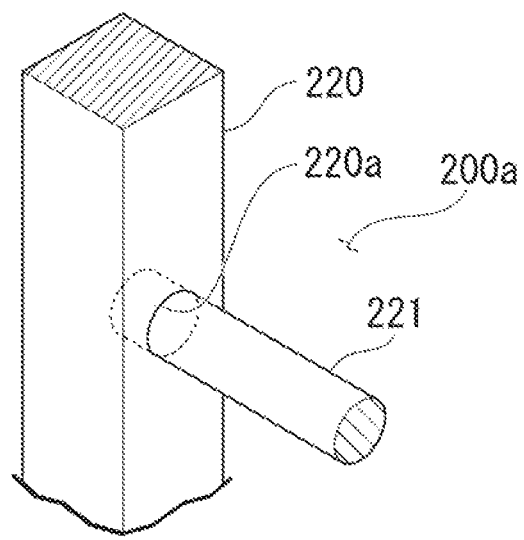
FIG. 9 is an explanatory diagram of a first molding step in a stator manufacturing method according to a second embodiment.

FIG. 9 is an explanatory diagram of a first molding step according to a second embodiment. The second embodiment is different from the first embodiment in that an engagement portion is formed in the first pin 220.

In the molding pin 202 shown in FIG. 9, the first pin 220 is formed in a prismatic shape extending in the X direction. The first pin 220 penetrates the cavity 200a while one surface of the outer peripheral surface faces the +Y side. The first pin 220 is provided with an engagement portion 220a which opens toward the +Y side. The engagement portion 220a is formed in, for example, a circular shape when viewed from the Y direction.

The second pin 221 is formed in a columnar shape extending in the Y direction. The outer diameter of the second pin (small-length pin) 221 is smaller than the length of the first pin (large-length pin) 220 in the Z direction. The −Y side end portion of the second pin 221 engages with the inside of the engagement portion 220a during clamping. Accordingly, the second pin 221 is supported by the first pin 220.

Even in such a configuration, it is possible to suppress the displacement or the deformation of the first pin 220 in the first molding step. In accordance with this, since the second pin 221 easily abuts against the first pin 220, it is possible to easily align the first pin 220 and the second pin 221 with high accuracy.

Other Modified Examples

The preferred embodiments of the present disclosure have been described above, but the present disclosure is not limited to these embodiments. The configuration may be added, omitted, replaced, or otherwise modified without departing from the spirit of the present disclosure. The present disclosure is not limited by the above description, but only by the appended claims.

For example, in the above-described embodiments, the EWP1 has been described as the electrical component in which the electronic component 34b is accommodated in the housing 12, but the present disclosure is not limited to this configuration. The configuration of the present disclosure can also be adopted in the electrical component other than the EWP1. The electrical components may be, for example, a motor other than EWP1, a vehicle electronic control unit (ECU), or the like, in this case, the electronic component (resistor) itself forming the electrical component may be molded in the second molded body.

In the above-described embodiments, a configuration in which the coil 42 or the like is molded in the second molded body has been described, but the present disclosure is not limited to this configuration. The second molded body may not mold a portion other than the connector receiver 45 if at least the outer opening 161b is closed.

In the above-described embodiments, a configuration in which part (rear surface covering portion 104a) of the stator mold portion 44 is used as the plug portion has been described, but the present disclosure is not limited to this configuration. The plug portion may be formed as a member separated from the mold portion. In this case, the plug portion may be Fitted or stuck to the outer opening 161b to close the outer opening 161b.

In the above-described embodiments, a configuration in which the first pin 220 and the second pin 221 are supported via the engagement portion formed at one pin has been described, but the present disclosure is not limited to this configuration. For example, the second pin 221 may only abut (engage) with the outer peripheral surface of the first pin 220.

In the above-described embodiments, a configuration in which the first pin 220 is supported by the first molding die 200 at both sides and the front end portion of the second pin 221 abuts (engages) with the first pin 220 has been described, but the present disclosure is not limited to this configuration. The second pin 221 may be supported by the first molding die 200 at both sides and the front end portion of the first pin 220 may engage with the second pin 221. In this case, the penetration hole located on the side opposite to the bottom surface opening 162b in the opening portion molded by the second pin 221 is closed by the plug portion.

In the above-described embodiments, a configuration in which the first concave portion 161 and the second concave portion 162 are orthogonal to each other has been described as an example, but the present invention is not limited to this configuration. The first concave portion 161 and the second concave portion 162 may intersect at an angle other than a right angle as long as the inside and outside of the housing 12 are communicated with each other.

In the above-described embodiments, a case in which one communication hole 160 is formed has been described, but the number or layout of the communication holes 160 may be appropriately changed.

In the above-described embodiments, a configuration in which the first concave portion 161 and the second concave portion 162 communicate with each other to form the communication hole 160 has been described, but the present disclosure is not limited to this configuration. In addition to the first concave portion 161 and the second concave portion 162, other concave portions may communicate with each other.

In addition, the components in the above-described embodiments can be appropriately replaced with well-known components without departing from the spirit of the present disclosure and the above-described modifications may be appropriately combined.

REFERENCE SIGNS LIST

1 EWP (electrical component)
12 Housing
31 Stator (connector receiver unit)
34b Electronic component
42 Coil (resistor)
44 Stator mold portion (second molding portion)
45 Connector receiver
100 Stator covering portion (covering portion)
104a Rear surface covering portion (plug portion)
150 Connector molding portion (first molding portion)
151 Receiver side terminal (terminal)
151a Substrate connection portion (first end portion)
151c Connector connection portion (second end portion)
135 Base portion
156 Mounting portion
160 Communication hole
161 Fust concave portion
161a inner opening (first opening, opening portion)
161b Outer opening (one opening portion, penetration hole)
162 Second concave portion
162a Communication opening (communication portion)
162b Bottom surface opening (second opening)
180 Connector
200 First molding die (molding die)
220 Fust pin (one pin, other pin, small-length pin, large-length pin)
22N Engagement portion
221 Second pin (other pin, one pin, large-length pin, small-length pin)
221a Engagement portion

The invention claimed is:

1. A method of manufacturing a connector receiver unit provided in a housing accommodating an electronic component and mounted with a connector extending from an external power supply so that the electronic component and the external power supply are electrically connected to each other, wherein the connector receiver unit includes a first molding portion which includes a base portion extending inside and outside the housing and a bottomed tubular mounting portion opening outside the housing and is integrally formed by a resin material and a terminal which includes a first end portion exposed inside the housing and connected to the electronic component and a second end portion exposed inside the mounting portion and connected to the connector and is provided to penetrate the first molding portion, wherein the first molding portion is provided with a communication hole which includes a first concave portion including a first opening inside the housing extending through the base portion in a first direction and a second concave portion including a second opening on a bottom surface of the mounting portion extending through the base portion in a second direction intersecting the first direction and communicates the inside and outside of the housing through the first concave portion and the second concave portion, wherein the method comprises a first molding step of forming the first molding portion by performing a molding operation with a resin material while a first pin forming the first concave portion, a second pin forming the second concave portion, and the terminal are set in a molding die, wherein in the first molding step, the first concave portion and the second concave portion are formed by performing an injection-molding operation while both end portions of one pin of the first pin and the second pin are supported by the molding die, one end portion of the other pin is supported by the molding die, and the other end portion of the other pin engages with the one pin and pulling out the first pin and the second pin, and wherein the method comprises a closing step of closing one of the opening portions formed by the one pin in the first molding portion by a plug portion after the first molding step.

2. The method of manufacturing the connector receiver unit according to claim 1, wherein in the closing step, the first molding portion is molded by a resin material to form the plug portion.

3. The method of manufacturing the connector receiver unit according to claim 1, wherein a length in a direction orthogonal to the second direction in the fin pin when viewed from the first direction is different from a length in a direction orthogonal to the first direction in the second pin when viewed from the second direction, and wherein a large-length pin in the first pin and the second pin is provided with an engagement portion which accommodates a small-length pin and regulates the relative movement of the first pin and the second pin.

4. A connector receiver unit comprising:

a first molding portion which includes a base portion extending inside and outside a housing accommodating an electronic component and a bottomed tubular mounting portion opening outside the housing and mounted with a connector extending from an external power supply and is integrally formed by a resin material; and a terminal which include a first end portion exposed inside the housing and connected to the electronic component and a second end portion exposed inside the mounting portion and connected to the connector and is provided to penetrate the first molding portion, wherein the first molding portion is provided with a communication hole which includes a first concave portion including a first opening inside the housing extending through the base portion in a first direction and a second concave portion including a second opening on a bottom surface of the mounting portion extending through the base portion in a second direction intersecting the first direction and communicates the inside and outside of the housing through the first concave portion and the second concave portion, wherein one concave portion of the first concave portion and the second concave portion penetrates the base portion in the first direction through a penetration hole, and wherein a plug portion is provided to close the penetration hole.

5. The connector receiver unit according to claim 4, wherein the connector receiver unit includes a second molding portion including the plug portion while molding the first molding portion.

6. The connector receiver unit according to claim 5, wherein the second molding portion includes a covering portion which covers a resistor inside the housing, and wherein the resistor is electrically connected to the electronic component.

7. The connector receiver unit according to claim 4, wherein a cross-sectional area orthogonal to the second direction in the second concave portion gradually increases as it goes from a communication portion with the first concave portion toward the second opening.

8. The connector receiver unit according to claim 4, wherein the plug portion is provided at a portion near the penetration hole with respect to a communication portion with the first concave portion and the second concave portion in the one concave portion.

9. An electrical component comprising:

a housing which accommodates an electronic component; and the connector receiver unit according to claim 4 which is provided in the housing.

* * * * *